United States Patent [19]

Langeland et al.

[11] Patent Number: 4,798,156
[45] Date of Patent: Jan. 17, 1989

[54] ARRANGEMENT FOR DEPLOYMENT OF SEISMIC CABLES

[75] Inventors: Jan-Age Langeland, Garnes; Einar Gjestrum, Boverbu; Rolf Bjerkoy, Melsomvik, all of Norway

[73] Assignee: Geco A.S., Sandvika, Norway

[21] Appl. No.: 71,353

[22] Filed: Jul. 9, 1987

[30] Foreign Application Priority Data

Jul. 17, 1986 [NO] Norway ................... 862885

[51] Int. Cl.⁴ .............................. B63B 21/56
[52] U.S. Cl. .................. 114/242; 405/166; 367/20
[58] Field of Search ............... 405/158, 165, 166, 167; 367/15, 20; 114/244, 254, 242

[56] References Cited

U.S. PATENT DOCUMENTS

| 2,465,696 | 3/1949 | Paslay | 367/20 X |
| 3,472,035 | 10/1969 | Broussard et al. | 405/167 |
| 3,942,737 | 3/1976 | Luzi | 114/254 X |
| 4,433,938 | 2/1984 | Boon | 405/166 |
| 4,480,574 | 11/1984 | Bertrams | 114/254 |
| 4,726,315 | 2/1988 | Bell et al. | 367/15 X |

FOREIGN PATENT DOCUMENTS 0020257  12/1980  European Pat. Off. ............ 405/166

Primary Examiner—Dennis L. Taylor
Attorney, Agent, or Firm—Holman & Stern

[57] ABSTRACT

An arrangement for deployment and towing of a plurality of seismic cables (2) in parallel and at a mutual distance behind a vessel whereby seismic cables (2) are wound on winch barrels (4), and are provided with an inner cable member (3) which forms a connection with the vessel (1) during a towing operations, and is, additionally, provided with a paravane/control (14, 15) to guide and maintain the cable (2) laterally in relation to the towing vessel (1). Reliable and simple deployment and towing of the seismic cables (2) at a large distance laterally in relation to the center line of the vessel is achieved by running the inner cable member (3) through at least one guide pulley (5) suspended from a line (7) that is adjustable in length from the vessel, and is, preferably extended over a derrick device (9) projecting from the vessel. Guide pulley (5) can be hauled in and paid out from the vessel, at the same time as inner cable member (3) can be let out to a greater length from the vessel.

10 Claims, 2 Drawing Sheets

ARRANGEMENT FOR DEPLOYMENT OF SEISMIC CABLES

BACKGROUND OF THE INVENTION

1. Field of the Invention

The invention relates to an arrangement for deployment of a plurality of seismic cables to be towed in parallel at a mutual distance behind a vessel during seismic explorations at sea.

2. Description of the Prior Art

In seismic explorations at sea arrangements of a plurality of seismic cables being towed behind the exploration vessel are used to an increasing degree. The cables are, thus, pulled off the stern of the vessel by suitable means and are guided outwards laterally by the aid of guiding and control systems, if desired, combined with paravanes ensuring that the cables are kept at a mutual distance. Recently, exploration systems were also developed involving several hydrophone cables or streamers which are towed in a parallel arrangement behind one vessel. In connection with such systems it is desired to pull the streamers as far apart as possible, and when more than two cables are used this.. desire becomes still more marked. With the aids used today there are limits of how far off the ship's side it will be possible to pull the cables, and in this connection there are also problems regarding deployment and hauling in the cables.

BRIEF SUMMARY OF THE INVENTION

It is an object of the present invention to provide a solution to the above mentioned problems, thus, to permit seismic cables to be towed at a large mutual distance at the same time as hauling in and deployment of the cables is carried out in a simple, reliable and rapid manner.

These objects are achieved by the invention wherein the seismic cables are wound on a winch barrel and are provided with an inner cable member which forms a connection with the vessel during towing operation, and the seismic cables are provided with a paravane/control means for guiding and positioning the cable laterally relative to the direction of propulsion of the vessel.

With the arrangement according to the invention it is possible to deploy the seismic cable from the stern even though it is attached to the ship's longitudinal side closer to the midship point during towing operations. By the aid of the flexible guide it is also possible to adjust the connection from the ship's side and the hauling in operation to the ship's side in a manner that is sufficiently flexible to permit the cable to be paid out especially far in relation to the ship. It is possible to position the cables up to 150 m laterally off the ship's centerline or propulsion line by the aid of the device according to the invention, thus, permitting a width of 300 m or more between the outermost streamers.

A further special feature of the arrangement according to the invention is that the inner cable member, or the so called "lead-in" cable, is the sole connection between the vessel and the streamer proper. This is an obvious improvement as regards flow resistance in the water.

Another characterizing feature of the invention is that the stretching forces in the inner cable member are solely absorbed by the outer end termination and by the winch barrel for the inner cable member. In a realization of the invention said cable member, also, will not be subjected to moments of flexure at other places than on the winch and in the guide pulley means which are, advantageously, provided with a curvature to be able to generate a maximum radius of curvature of the cable of 0.5 m.

BRIEF DESCRIPTION OF THE DRAWINGS

The invention will now be disclosed in greater detail with reference to the embodiment shown in the accompanying drawing, wherein.

DETAILED DESCRIPTION

Figure 1:
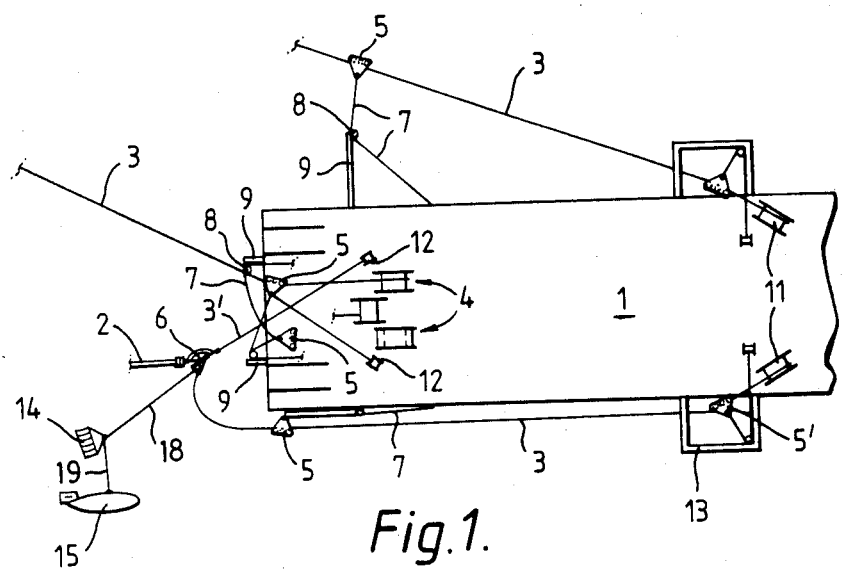
FIG. 1 is a diagrammatic elevational view of the stern of a seismic vessel, illustrating the cable and winch means at the beginning of deploying.
Figure 2:
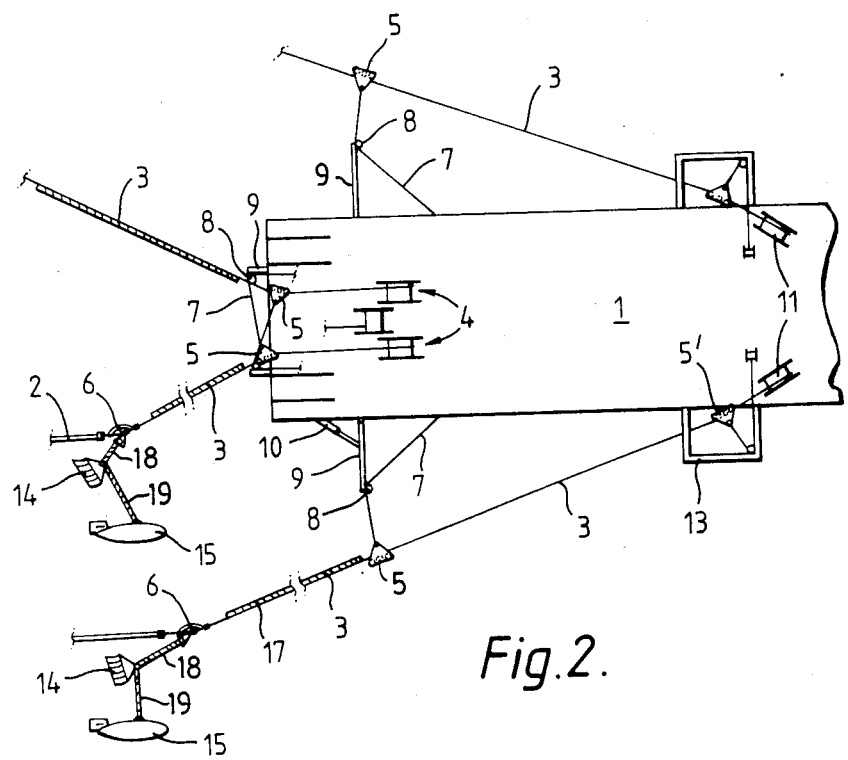
FIG. 2 is a view corresponding to FIG. 1, but illustrating a later step of deployment.
Figure 3:
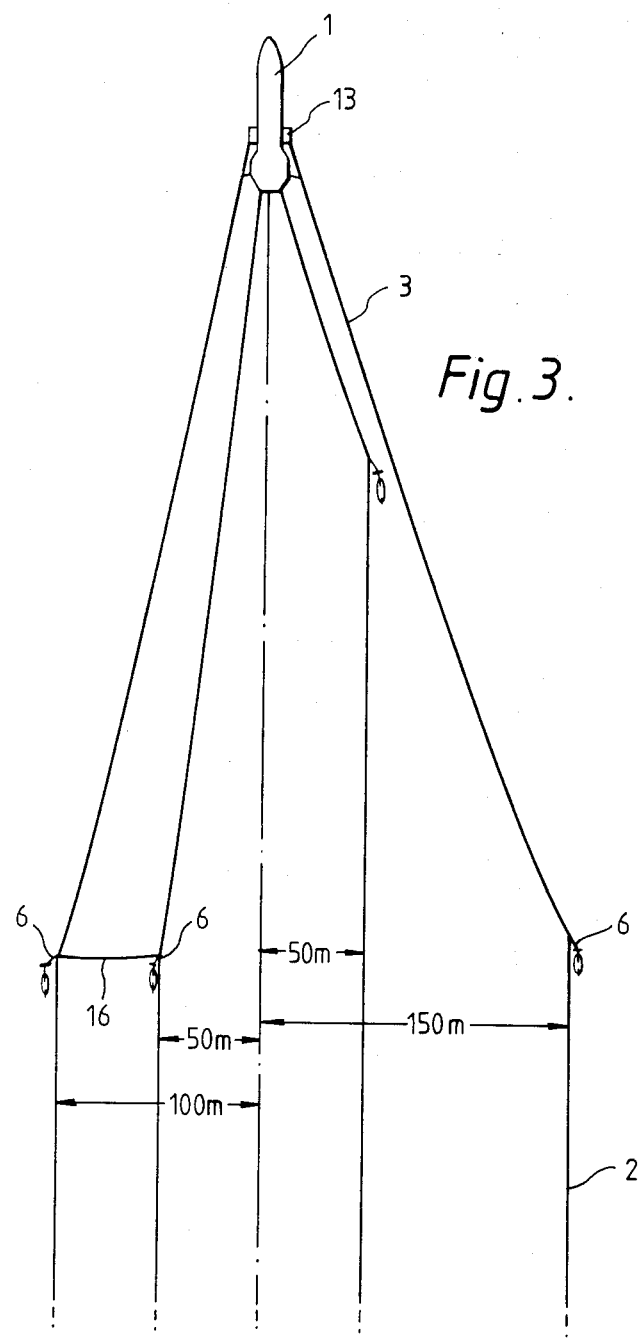
FIG. 3 is a diagrammatic elevational view illustrating several cables towed in a mutually parallel arrangement at different mutual distances.

FIGS. 1 and 2 of the drawing show schematically the rear half of a seismic towing vessel, illustrating the principles of the arrangement of deployment according to the present invention. The vessel proper is designated 1, whereas the seismic cable, e.g. a streamer, is designated 2. The inner cable member, or the so called lead-in cable is designated 3. Each winch barrel for the streamers is designated 4 and is provided on the after deck of the ship, from which there is free access to the sea. In FIGS. 1 and 2 utilization of four cables in a towing formation is illustrated, the cables to be towed, e.g. in a pattern appearing from FIG. 3. Both innermost cables are, thus, towed directly from the stern, whereas both outermost cables which are to be deployed at a maximum lateral distance from the vessel are secured at points approximately midships on the vessel and are conveyed laterally by the aid of the arrangement according to the invention, as disclosed in more detail below. In FIG. 1 the outermost cable deploying means on the right hand side is shown in a folded back state at the very beginning of deployment. The corresponding outermost deploying means on the opposite side is indicated with an extended derrick means. Only one of the two innermost cables is shown in FIG. 1, the other one illustrating a retracted position.

Deployment of the outermost streamers, i.e. those secured midships on the vessel, will be disclosed first. On the longitudinal side of the vessel a frame structure 13 is provided to receive a guide pulley means for the inner cable member 3, which runs to a winch 11 where it can be hauled in or paid out, respectively. Further to the rear of the longitudinal side of the vessel a derrick 9 is attached and can be turned to a position normal to the ship's side, e.g. by the aid of a hydraulic cylinder means 10, illustrated in FIG. 2. The inner cable member, thus, extends from winch 11 along the ship's side over a guide pulley means 5 which is, in position as shown in FIG. 1, adjacent to the derrick, and to the ship's side, and further rearwards to be joined with the streamer proper which is designated 6 in the drawing.

From this point another line member 3' runs close to a winch 12 that is, preferably, provided on a diagonal line across the after deck of the ship. Winch 12 is rotatable about a vertical axis. By the aid of said line 3' the fastening point 6 can be pulled onto the after deck for mounting a streamer 2 and the additional equipment necessary to keep the cable off laterally, e.g:,-an otter board 14 and a floating body, e. g. a paravane 15 which members are known per se. Streamer 2 starts running from a streamer winch 4, or it is transferred from an auxiliary craft. After mounting these members are let out into the sea by paying out from winch 12, and then otter board 14 and paravane 15 will pull the streamer cable 2 out laterally. Inner cable member 3 is now pulled in, so that its end termination is provided inwards to the aft guide pulley means (in the derrick). Line 3' can be released, and the derrick 9 is turned out 90°0 relative to the ship's side, as illustrated in FIG. 2 and at the top top of FIG. 1. This will cause extension of line 7 that runs over a pulley 8 at the outermost end of derrick 9, so that the guide pulley means 5 provided at the end of line 7 is moved outwards and away from the ship's side. The derrick means and the guide pulley means are also intended to prevent,, the inner cable member and the paravane system from contacting with the ship screw. Otherwise this might happen if the otter door turns the wrong way. By paying out inner cable member 3 the streamer cable 2 may be positioned at a desired distance from the ship's side, e.g. at a distance of 150 m, as illustrated at the right hand side in FIG. 3. When the cable is to be pulled in the sequence is reversed, the inner cable member 3 is pulled in while line 7 is also tensioned by folding derrick inwardly along the ship's side whereby the guide pulley means is drawn close to the ship's side. Then line 3' may either be secured to fastening point 6 which may be close to guide pulley means 5, or the line may be secured there in advance, so that the seismic cable 2 can be pulled in according to the same pattern as illustrated in FIG. 1. This operation can be carried out in a simple and very reliable manner.

When deploying the two inner seismic streamers 2 an arrangement of the same kind, but modified for being placed on the stern of the ship, is used. In this case as well, a derrick 9 is used with a line 7 that may be paid out and pulled in to provide a guide pulley means 5 in the correct position for deploying the cable. In FIG. 1 a line 7 is shown from the derrick on top of the figure which line 7 curves close to a guide pulley means 5 provided on the ship deck. In this position the guide pulley means can be mounted on the seismic cable. After deployment of the seismic cable proper the fastening device is mounted to the outer end of inner cable member 3 (lead in). In the same Figure, the next step of deployment is indicated from the lowermost derrick 9, with guide pulley means 5 at the bottom of the Figure moving outside the edge of the after deck, where the fastening point between inner cable member 3 and seismic cable 2 is also illustrated. By paying out more inner cable member, e.g. from one of winches 4, it is possible to adjust the positioning of the streamer cable in relation to the longitudinal axis of the ship and in relation to the other; cables, In FIG. 3 various positions of this kind are illustrated, and different suitable distances are also indicated from the center line of the ship, and how they may be achieved by the aid of different lengths of the inner cable member, and possibly, also by use of an intermediate cable 16 between two streamer cables, preferably between fastening points 6. In this case an otter board is only is used on the outer cable. In FIG. 2 utilization of so called fairing 17 provided on the inner cables that are in the water, and on wires (lines), 18, 19, between the end point of the inner cable and the otter board, and between the otter board and the float is illustrated, the object of fairings being to reduce the frictional resistance in the water and the level of vibrations in the cables. Such fairings 17 are previously known.

With the arrangement according to the invention a desired number of seismic cables, preferably streamer cables, can be deployed in a simple and reliable manner behind a seismic vessel, and the cables can be placed at a desired distance from the center axis of the vessel, and from other cables, respectively.

It should be pointed out that a very rough illustration only of the principles of the arrangement according to the present invention, and of how said principles may be used at different areas of a vessel is presented above. Obviously, many modifications will be possible as regards building such an arrangement, and all such possibilities are intended to fall within the scope of the invention. The arrangement according to the invention is the only known system by the aid of which it is possible to achieve a streamer separation of more than 150 m, widths of 300 m having been achieved in experiments. It is assumed that a maximum width between the outermost cables of 450 to 500 m may be achieved. In the arrangement according to the invention the inner cable members will form the sole connection between the ship and paravane 15. In this manner the flow resistance in the water will be the lowest possible. The tensional forces occurring in inner cable member 3 may be absorbed by outer end termination 6 and by the winch barrel. The inner cable member will not be subjected to moments of flexure at other places than on the winch and in the guide pulley, means 5, preferably having a radius of curvature larger than 0.5 m.

We claim:

1. An arrangement for deployment and towing of a plurality of seismic streamers behind a vessel in parallel at mutually spaced distances comprising for each seismic streamer:

a winch barrel rotatably mounted on the vessel;

an inner cable member connected to the seismic streamer and wound on said winch barrel for towing the seismic streamer at variable distances from the vessel;

a derrick means mounted on the vessel;

a guide pulley line extending from the vessel over said derrick means;

a guide pulley means suspended on said guide pulley line, said inner cable member running through said guide pulley means;

means for adjusting the disposition of said guide pulley means relative to the vessel for adjusting the position of said guide pulley means and said inner cable member relative to the vessel and said derrick means; and paravane control means attached to said inner cable member for controlling the lateral disposition of the seismic streamer and said inner cable member when the seismic streamer is deployed for use.

2. An arrangement as claimed in claim 1 wherein:

said means for adjusting the disposition of said guide pulley means comprises at least one of said derrick means being adjustable mounted on one side of the vessel for adjustment between 0 and 90 degrees positions relative to said one side of the vessel; and said winch barrel is mounted on the vessel forward of said derrick means between said derrick means and the bow of the vessel.

3. An arrangement as claimed in claim 1 and further comprising:
- a pull line winch means mounted on the vessel adjacent the stern thereof; and
- a pull line wound on said pull line winch and connected to said inner cable member for pulling in and letting out the seismic streamer relative to the vessel.

4. An arrangement as claimed in claim 2 and further comprising:
- a pull line winch means mounted on the vessel adjacent the stern thereof; and
- a pull line wound on said pull line winch and connected to said inner cable member for pulling in and letting out the seismic streamer relative to the vessel.

5. An arrangement as claimed in claim 3 wherein:
- said pull line winch means is on a diagonal line towards the side of the vessel opposite to the side on which said derrick means is mounted.

6. An arrangement as claimed in claim 4 wherein:
- said pull line winch means is on a diagonal line towards the side of the vessel opposite to the side on which said derrick means is mounted.

7. An arrangement as claimed in claim 1 wherein:
- said guide pulley means is formed in the shape of a curved guide having a radius of curvature greater than 0.5 m.

8. An arrangement as claimed in claim 6 wherein: said guide pulley means is formed in the shape of a curved guide having a radius of curvature greater than 0.5 m.

9. An arrangement as claimed in claim 2 wherein said derrick means comprises:
- an elongated member having an inner end pivotally mounted at the side of the vessel and an outer end;
- an outer pulley at said outer end of said elongated member;
- said guide pulley line having one end attached to the vessel, passing over said outer pulley, and having the other end thereof attached to said guide pulley means; and
- hydraulic piston and cylinder means between the vessel and said elongated member for adjusting said position of said derrick relative to the vessel.

10. An arrangement as claimed in claim 8 wherein said derrick means comprises:
- an elongated member having an inner end pivotally mounted at the side of the vessel and an outer end;
- an outer pulley at said outer end of said elongated member;
- said guide pulley line having one and attached to the vessel, passing over said outer pulley, and having the other end thereof attached to said guide pulley means; and
- hydraulic piston and cylinder means between the vessel and said elongated member for adjusting said position of said derrick relative to the vessel.

* * * * *